(12) United States Patent
Truong et al.

(10) Patent No.: US 11,798,544 B2
(45) Date of Patent: Oct. 24, 2023

(54) REPLYING TO A SPOKEN COMMAND

(71) Applicant: Polycom, LLC, San Jose, CA (US)

(72) Inventors: Kwan Truong, Lilburn, GA (US); Yibo Liu, Reading, MA (US); Peter L. Chu, Lexington, MA (US); Zhemin Tu, Austin, TX (US); Jesse Coleman, Manchaca, TX (US); Cody Schnacker, Westminster, TX (US); Andrew Lochbaum, Cedar Park, TX (US)

(73) Assignee: Polycom, LLC, San Jose, CA (US)

( * ) Notice: Subject to any disclaimer, the term of this patent is extended or adjusted under 35 U.S.C. 154(b) by 417 days.

(21) Appl. No.: 15/670,572

(22) Filed: Aug. 7, 2017

(65) Prior Publication Data

US 2019/0042187 A1 Feb. 7, 2019

(51) Int. Cl.
| | | |
|---|---|---|
| G10L 15/22 | (2006.01) | |
| G06F 3/16 | (2006.01) | |
| H04L 12/28 | (2006.01) | |
| G10L 17/24 | (2013.01) | |
| G10L 15/30 | (2013.01) | |
| G06F 21/32 | (2013.01) | |
| H04N 21/00 | (2011.01) | |

(52) U.S. Cl.
CPC ............ *G10L 15/22* (2013.01); *G06F 3/167* (2013.01); *G06F 21/32* (2013.01); *G10L 15/30* (2013.01); *G10L 17/24* (2013.01); *H04L 12/282* (2013.01); *H04L 12/2829* (2013.01); *H04N 21/00* (2013.01); *G06F 2221/2111* (2013.01); *G10L 2015/223* (2013.01)

(58) Field of Classification Search
CPC ... G10L 15/22; G10L 15/30; G10L 2015/223; H04M 3/56; H04M 3/567
USPC ...................................... 704/275; 379/202.01
See application file for complete search history.

(56) References Cited

U.S. PATENT DOCUMENTS

| | | | | |
|---|---|---|---|---|
| 9,031,216 | B1 * | 5/2015 | Kamvar ................. | G10L 15/30 379/202.01 |
| 2006/0116885 | A1 * | 6/2006 | Shostak ........................ | 704/273 |
| 2007/0032225 | A1 * | 2/2007 | Konicek ........... | H04M 1/72513 455/417 |
| 2007/0127642 | A1 * | 6/2007 | Bae ......................... | H04M 3/02 379/88.13 |
| 2008/0181140 | A1 * | 7/2008 | Bangor ............... | H04L 12/1818 370/261 |
| 2008/0275701 | A1 * | 11/2008 | Wu ........................ | G06F 16/685 704/235 |
| 2012/0323579 | A1 * | 12/2012 | Gibbon ............... | G10L 15/1822 704/270 |
| 2013/0096813 | A1 * | 4/2013 | Geffner ................... | H04W 4/02 701/117 |

(Continued)

*Primary Examiner* — Shaun Roberts
(74) *Attorney, Agent, or Firm* — Quarles & Brady LLP

(57) ABSTRACT

A method includes, during a teleconference between a first audio input/output device and a second audio input/output device, receiving, at an analysis and response device, a signal indicating a spoken command, the spoken command associated with a command mode. The method further includes, in response to receiving the signal, generating, at the device, a reply message based on the spoken command, the reply message to be output to one or more devices selected based on the command mode. The one or more devices includes the first audio input/output device, the second audio input/output device, or a combination thereof.

21 Claims, 7 Drawing Sheets

(56) References Cited

U.S. PATENT DOCUMENTS

| | | | |
|---|---|---|---|
| 2013/0141516 A1* | 6/2013 | Baldwin | H04N 7/152 |
| | | | 348/E7.077 |
| 2013/0183946 A1* | 7/2013 | Jeong | G06F 3/167 |
| | | | 455/414.1 |
| 2015/0110259 A1* | 4/2015 | Kaye | H04W 4/80 |
| | | | 379/202.01 |
| 2016/0180844 A1* | 6/2016 | VanBlon | G10L 15/22 |
| | | | 704/275 |
| 2016/0255494 A1* | 9/2016 | Shin | H04L 51/16 |
| | | | 455/415 |
| 2017/0263265 A1* | 9/2017 | Ashikawa | G06F 3/04817 |
| 2018/0025725 A1* | 1/2018 | Qian | G10L 15/02 |
| | | | 704/257 |

* cited by examiner

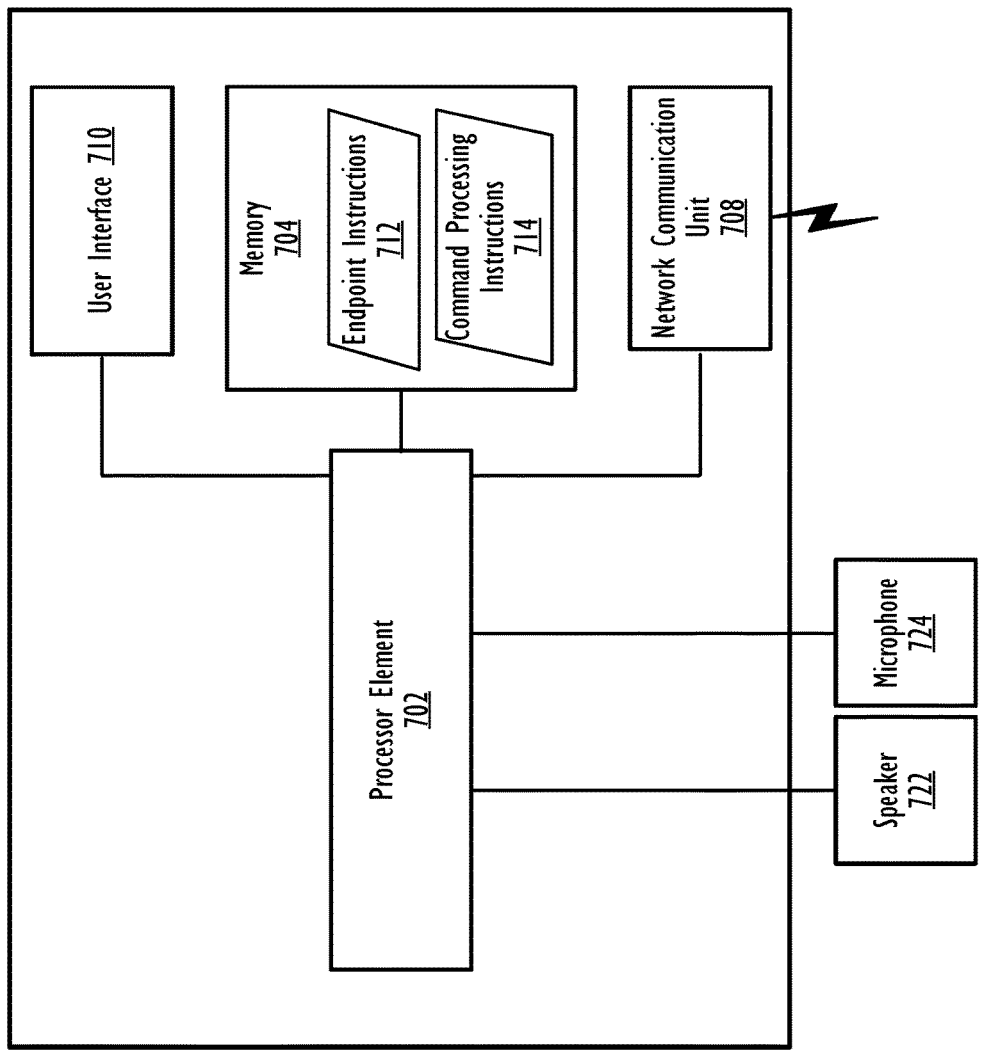

REPLYING TO A SPOKEN COMMAND

TECHNICAL FIELD

The present disclosure relates generally to replying to spoken commands.

BACKGROUND

Communication systems may enable users to communicate over large distances. For example, a communication system may be configured to provide a teleconference that enables users in different locations to see and/or hear each other. Such communication systems may be controlled using a remote control device. However, using such a remote control device to control the communication system may be inconvenient. Further, creating a remote control device having a physical button corresponding to each command supported by the communication system may be impractical.

SUMMARY

Systems and methods according to the disclosure enable a communication system to respond to spoken commands during a communication session between devices. Issuing spoken commands may be more convenient for a user. Further, a manufacturer of a communication system may enable user interactivity with the communication system without providing a remote control that includes a button corresponding to each possible command.

A method includes, during a teleconference between a first audio input/output device and a second audio input/output device, receiving, at an analysis and response device, a signal indicating a spoken command, the spoken command associated with a command mode. The method further includes, in response to receiving the signal, generating, at the analysis and response device, a reply message based on the spoken command, the reply message to be output to one or more devices selected based on the command mode. The one or more devices includes the first audio input/output device, the second audio input/output device, or a combination thereof.

An apparatus includes a processor and a memory storing instructions that, when executed by the processor, cause the processor to perform operations. The operations include, during a communication session between a first audio input/output device and a second audio input/output device, receiving a signal indicating a spoken command, the spoken command associated with a command mode. The operations further include, in response to receiving the signal, generating a reply message based on the spoken command, the reply message to be output to one or more devices selected based on the command mode, where the one or more devices include the first audio input/output device, the second audio input/output device, or a combination thereof.

A computer-readable storage devices stores instructions that, when executed by a processor, cause the processor to perform operations. The operations include, during a communication session between a first audio input/output device and a second audio input/output device, receiving a signal indicating a spoken command, the spoken command associated with a command mode. The operations further include, in response to receiving the signal, generating a reply message based on the spoken command, the reply message to be output to one or more devices selected based on the command mode, where the one or more devices include the first audio input/output device, the second audio input/output device, or a combination thereof.

BRIEF DESCRIPTION OF THE DRAWINGS

Embodiments described herein are illustrated by way of example and not limitation in the figures of the accompanying drawings, in which like references indicate similar features. It should be understood that the full scope of the inventions disclosed herein are not limited to the precise arrangements, dimensions, and instruments shown. Furthermore, in the drawings, some conventional details have been omitted so as not to obscure the inventive concepts described herein.

FIG. 7 illustrates a computing device corresponding to communication endpoint device and operable to perform one or more methods disclosed herein according to the present invention.

DETAILED DESCRIPTION

Figure 1:
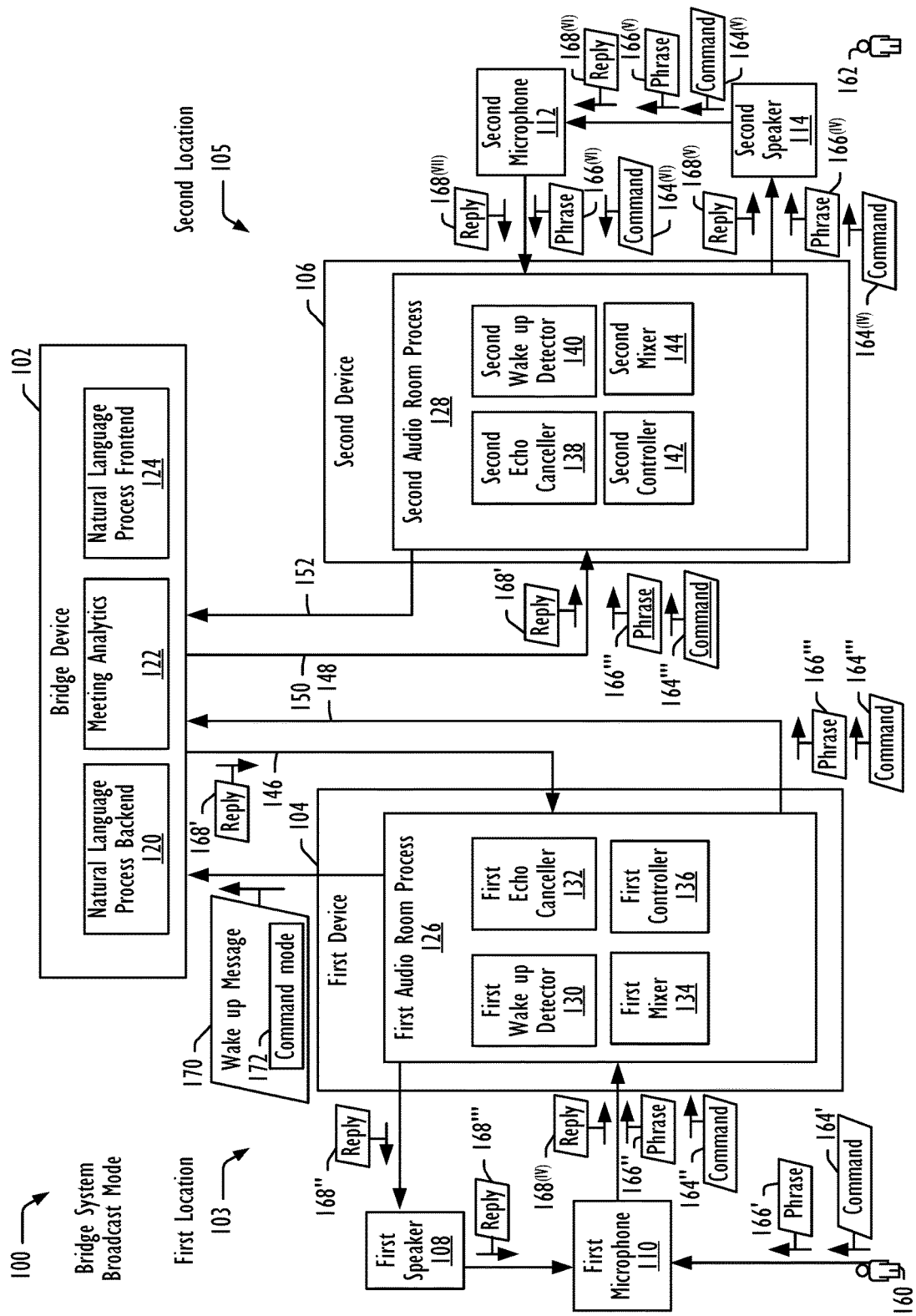
FIG. 1 is a block diagram of a first system for responding to spoken commands operating in a broadcast mode according to the present invention.

Reference to the drawings illustrating various views of exemplary embodiments is now made. In the following description, numerous specific details are set forth, such as specific configurations, methods, etc., in order to provide a thorough understanding of the embodiments. At least one of the described embodiments is practicable without one or more of these specific details, or in combination with other known methods and configurations. In other instances, well-known processes and techniques have not been described in particular detail to avoid obscuring the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one implementation. Thus, the appearances of the phrase "in one embodiment," "in an embodiment," "in another embodiment," "in other embodiments," "in some embodiments," or their variations in various places throughout this specification are not necessarily referring to the same embodiment. Furthermore, the particular features, structures, configurations, or characteristics are combinable in any suitable manner in one or more embodiments. In the drawings and the description of the drawings herein, certain terminology is used for convenience only and is not to be taken as limiting the embodiments of the present disclosure. Furthermore, in the drawings and the description below, like numerals indicate like elements throughout.

In the following description and claims, the terms "coupled" and "connected," along with their derivatives, are not intended as synonyms for each other. "Coupled" is used to indicate that two or more elements or components can directly or indirectly communicate with each other. "Connected" is used to indicate that two or more elements or components are directly linked with each other.

Any marks that have been referenced herein is by way of example and shall not be construed as descriptive or to limit the scope of the embodiments described herein to material associated only with such marks.

Figure 2:
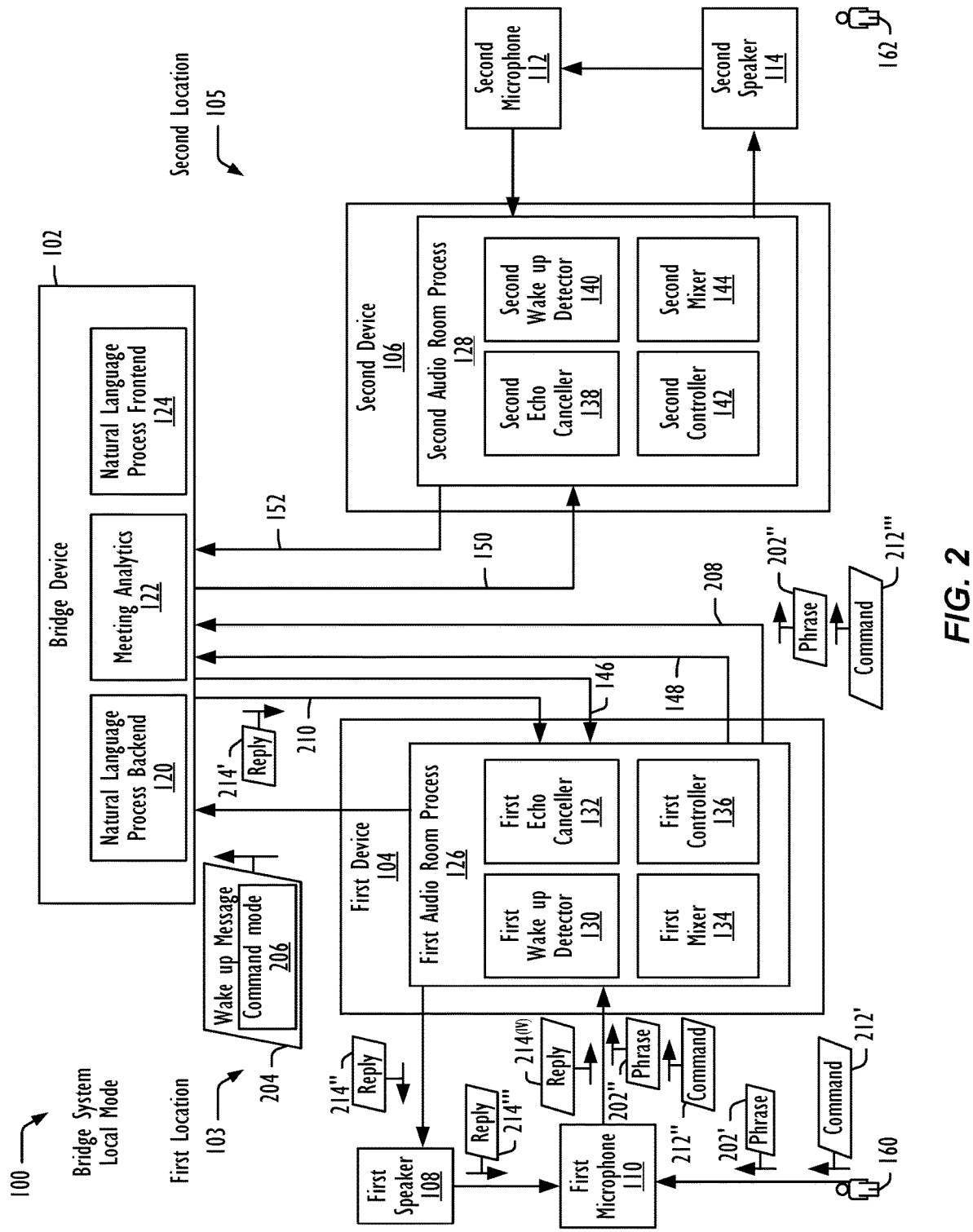
FIG. 2 is another block diagram of the first system for responding to spoken commands operating in a local mode according to the present invention.
Figure 3:
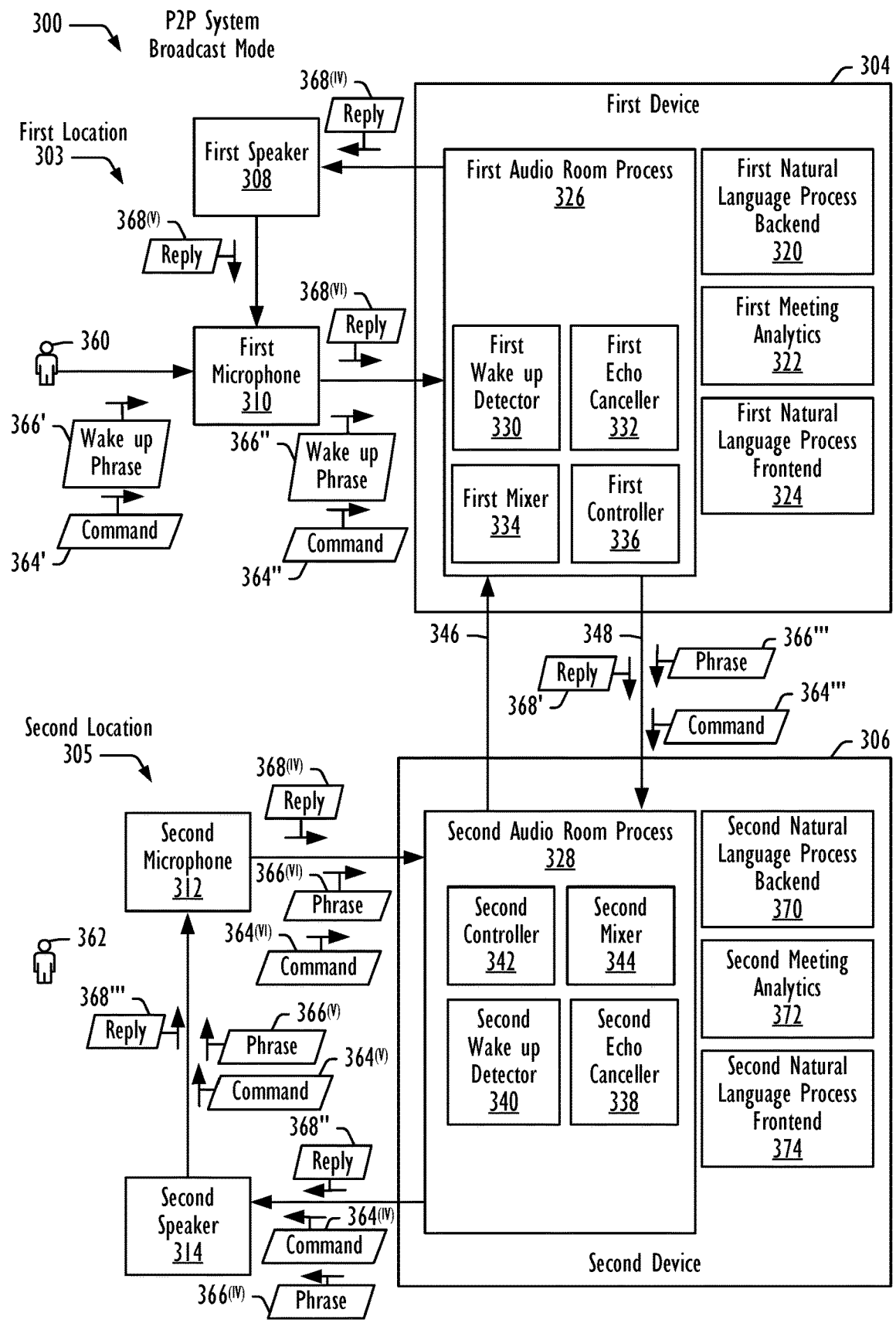
FIG. 3 is block diagram of a second system for responding to spoken commands operating in a broadcast mode according to the present invention.
Figure 4:
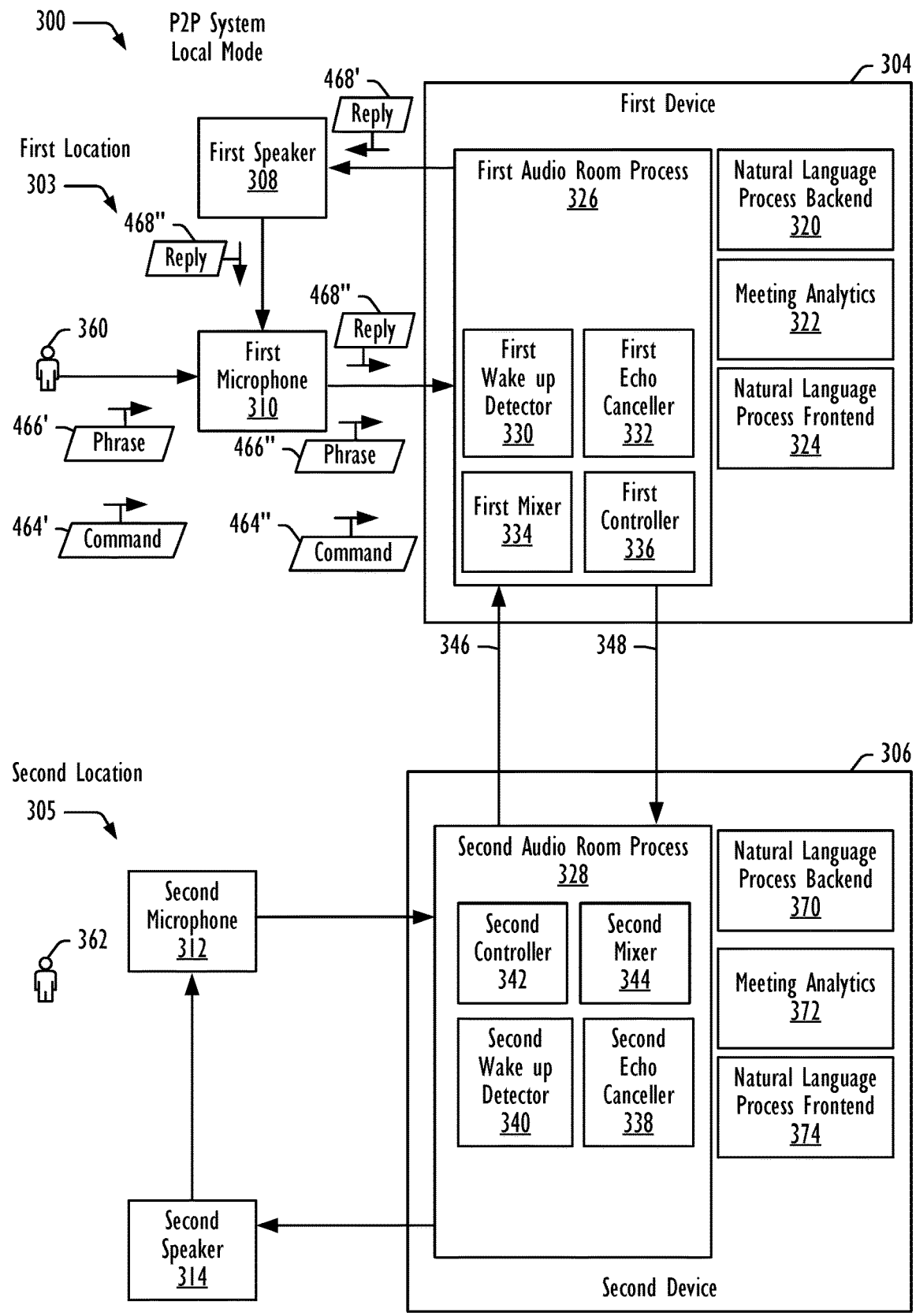
FIG. 4 is another block diagram of the second system for responding to spoken commands operating in a local mode according to the present invention.

The present disclosure enables one of skill in the art to provide a system to perform actions in response to spoken commands during a communication session between two devices. In an embodiment according to the present invention, a communication system (e.g., a teleconference system) processes and responds to a spoken command uttered by a participant in a teleconference. In some embodiments, a bridge is configured to facilitate a communication session (e.g., a teleconference) between two devices. In other embodiments, the communication system utilizes peer to peer communications between devices. In embodiments according to the present invention, a device controls, based on a command mode, which devices participating in the communication session output messages associated with the spoken command. For example, in a broadcast mode the command and a reply to the command are inserted into one or more streams of the communication session. In a local mode, the command and the reply are communicated independently of streams of the communication session. FIG. 1 illustrates a system (e.g., a teleconference system) including a bridge device operating in the broadcast mode, and FIG. 2 illustrates the system including the bridge device operating in the local mode. FIG. 3 illustrates a system (e.g., a teleconference system) that utilizes peer to peer connections operating in the broadcast mode, and FIG. 4 illustrates the system that utilizes peer to peer connections operating in the local mode.

Referring to FIG. 1, a diagram illustrating a system 100 for replying to a spoken command is shown. The system 100 includes a bridge device 102, a first speaker 108, a first microphone 110, a first device (e.g., a first audio input/output device) 104, a second device (e.g., a second audio input/output device) 106, a second microphone 112, and a second speaker 114. In some implementations, the bridge device 102, the first device 104, and the second device 106 correspond to computing devices that each include a corresponding processor and a corresponding memory device (not shown). In some implementations, the first device 104 and the second device 106 correspond to teleconference devices configured to exchange audio data, video data, text data, or a combination thereof. The bridge device 102 is configured to facilitate communication between the first device 104 and the second device 106. Accordingly, the first device 104 and the second device 106 are endpoints in the communication session.

The bridge device 102 includes a natural language process backend module 120, a meeting analytics module 122, and a natural language process frontend module 124. The natural language process backend module 120, the meeting analytics module 122, and the natural language process frontend module 124 correspond to software executed by a processor of the bridge device 102, to dedicated hardware of the bridge device 102, or to a combination thereof. The natural language process frontend module 124 is configured to parse speech or text data to detect a command and to reply to the command. The natural language process backend module 120 is configured to forward the command to another device, retrieve multimedia content, or perform other actions based on the command. The meeting analytics module 122 is configured to generate statistics related to communication (e.g., a teleconference meeting) between the first device 104 and the second device 106. As used herein, the bridge device 102 is an analysis and response device because the natural language process backend module 120, the meeting analytics module 122, and the natural language process frontend module 124 enable the bridge device 102 to analyze and respond to spoken commands.

The first device 104 is located at a first location 103 and includes a first audio room process module 126 that includes a first wake up detector module 130, a first echo canceller module 132, a first mixer module 134, and a first controller module 136. The first location 103 usually corresponds to a conference room. The first wake up detector module 130, the first echo canceller module 132, the first mixer module 134, and the first controller module 136 correspond to software executed by a processor of the first device 104, to dedicated hardware of the first device 104, or to a combination thereof. Functions of the first wake up detector module 130, the first echo canceller module 132, the first mixer module 134, and the first controller module 136 are described further below. The first device 104 is coupled to the first speaker 108 and the first microphone 110. In some embodiments, the first device 104 is further coupled to a first display device (not shown). In some implementations of the system 100, one or both of the first speaker 108, the first microphone 110, and the first display device are components of the first device 104 rather than separate devices. In some implementations of the system 100, the first device 104 include more or fewer components than illustrated.

The second device 106 is located at a second location 105 and includes a second audio room process module 128 that includes a second echo canceller module 138, a second wake up detector module 140, a second controller module 142, and a second mixer module 144. The second location 105 is distinct from the first location 103 and in some embodiments corresponds to a conference room. The second wake up detector module 140, the second echo canceller module 138, the second mixer module 144, and the second controller module 142 correspond to software executed by a processor of the second device 106, to dedicated hardware of the second device 106, or to a combination thereof. Functions of the second wake up detector module 140, the second echo canceller module 138, the second mixer module 144, and the second controller module 142 are described further below. The second device 106 is coupled to the second speaker 114 and the second microphone 112. In some embodiments, the second device 106 is further coupled to a second display device (not shown). In some implementations of the system 100, one or both of the second speaker 114, the second microphone 112, and the second display device are components of the second device 106 rather than separate devices. In some implementations of the system 100, the second device 106 includes more or fewer components than illustrated.

The bridge device 102 supports a communication session (e.g., a teleconference) between the first device 104 and the second device 106. The communication session is conducted via a plurality of streams. In the example shown in FIG. 1, the communication session is conducted via a first input stream 146, a first output stream 148, a second input stream 150, and a second output stream 152. Each of the plurality of streams carries data corresponding to multimedia content. For example, the first output stream 148 carries data corresponding to audio or video content captured at the first location 103 (e.g., by first microphone 110 and/or a video capture device) from the first device 104 to the bridge device 102. The bridge device 102 generates the second input stream 150 based on the first output stream 148 and transmit the second input stream 150 to the second device 106. Similarly, the second output stream 152 carries data corresponding to audio or video content captured at the second location 105 (e.g., by the second microphone 112 and/or a video capture device) from the second device 106 to the bridge device 102. The bridge device 102 generates the first input stream 146 based on the second output stream 152 and transmits the first input stream 146 to the first device 104. Thus, the bridge device enables the communication session between the first device 104 and the second device 106. The communication session enables a first user 160 at the first location 130 to speak with and/or see a second user 162 at the second location 105.

During the communication session, the bridge device 102 receives and responds to data indicating one or more spoken commands from one or both of the first device 104 and the second device 106. The bridge 102 is configured to respond to a particular command based on a command mode associated with the particular command. FIG. 1 illustrates an example of the bridge device 102 responding to a command in a broadcast mode. In some implementations, the bridge device 102 also respond to commands according to a local mode, as described below with reference to FIG. 2. Further, in some implementations, the bridge device 102 is configured to operate in the local mode with respect to commands from one device while operating in broadcast mode with respect to commands from the other device.

In the example illustrated in FIG. 1, the first user 160 speaks a wake up phrase 166, and the first microphone 110 receives acoustic waves corresponding to a wake up phrase 166' spoken by the first user 160 during the communication session (e.g., during a teleconference). For example, the first microphone 110 receives acoustic waves corresponding to the first user 160 saying "wake up." The first microphone 110 converts the acoustic waves corresponding to the wake up phrase 166' to a signal (e.g., a digital or analog electrical or radio signal) indicating the wake up phrase 166" and transmits the signal indicating the wake up phrase 166" to the first device 104. The first wake up detector module 130 searches input from the first microphone 110 for the wake up phrase 166. In response to receiving the signal indicating the wake up phrase 166", the first wake up detector module 130 causes the first device to transmit a wake up message 170 to the bridge device 102. The wake up message 170 indicates a command mode 172. The first wake up detector module 130 determines the command mode 172 based on the wake up phrase 166. In an illustrative example, the first wake up detector module 130 sets the command mode 172 to broadcast mode in response to the wake up phrase 166 corresponding to "wake up broadcast." It should be noted that in other embodiments, the first device 104 transmits the wake up message 170 in response to a different triggering signal. In an illustrative example, the first device 104 transmits the wake up message 170 to the bridge device 102 in response to a signal from a remote control device indicating a button selection. In some embodiments, the first device 104 selects the command mode 172 based on content of the triggering signal, a source (e.g., the remote control device or the first microphone 110) of the triggering signal, or based on a default setting. In an illustrative example, the first device 104 selects the command mode 172 based on which button of the remote control device is indicated by the signal (or based on content of the wake up phrase 166). In another illustrative example, the first device 104 sets the command mode 172 to the broadcast mode based on a default setting in response to the triggering signal not indicating a command mode selection.

In response to receiving the wake up message 170, the natural language process frontend module 124 "wakes up" and begin searching one or more streams for one or more spoken commands based on the command mode 172. In the broadcast mode, the natural language process frontend module 124 searches streams associated with the communication session (e.g., the teleconference) for the one or more commands.

In addition to outputting the wake up message 170, the first device 104 includes data corresponding to the wake up phrase 166''' in the first output stream 148. For example, the first controller module 136 inserts the data corresponding to the wake up phrase 166''' into the first output stream 148. The bridge device 102 receives the data corresponding to the wake up phrase 166''' and, in response to the command mode 172 indicating the broadcast mode, includes the data corresponding to the wake up phrase 166''' in the second input stream 150. The second device 106 receives the data corresponding to the wake up phrase 166''', and the second mixer module 144 outputs an audio signal corresponding to the wake up phrase $166^{(IV)}$ to the second speaker 114. In response to the audio signal corresponding to the wake up phrase $166^{(IV)}$, the second speaker 114 outputs acoustic waves corresponding to the wake up phrase $166^{(V)}$ at the second location 105. Further, the second microphone 112 detects the acoustic waves corresponding to the wake up phrase $166^{(V)}$ and transmits an audio signal indicating the wake up phrase $166^{(VI)}$ to the second device 106.

In addition to transmitting the audio signal indicating the wake up phrase $166^{(VI)}$ to the second speaker 114, the second mixer module 144 transmits the audio signal indicating the wake up phrase $166^{(VI)}$ to the second echo canceller module 138. Based on the audio signal indicating the wake up phrase $166^{(VI)}$, the second echo canceller module 138 removes the wake up phrase 166 from the audio signal from the second microphone 112. Accordingly, the second wake up detector module 140 does not detect the wake up phrase 166 and data corresponding to the wake up phrase 166 is not included in the second output stream 152.

As described above, the natural language process frontend module 124 of the bridge device 102 searches streams of the communication session for one or more spoken commands in response to the command mode 172 indicating the broadcast mode. The one or more spoken commands include a request to create a summary of the communication session, a request for information (e.g., weather forecast), a request for multimedia content, a request to control a device, another command, or a combination thereof.

In the example illustrated in FIG. 1, the first user 160 speaks a command 164 during the communication session, and the first microphone 110 receives acoustic waves corresponding to the command 164'. In an illustrative example, the first microphone 110 receives acoustic waves corresponding to the first user 160 saying "What's the weather like?" The first microphone 110 converts the acoustic waves corresponding to the command 164' to a signal (e.g., a digital or analog electrical or radio signal) indicating the command 164" and transmits the signal indicating the command 164" to the first device 104. Based on the signal indicating the command 164", the first device 104 inserts data corresponding to the command 164''' into the first output stream 148. In a particular embodiment, the first controller module 136 inserts the data corresponding to the command 164''' into the first output stream 148.

As used herein a spoken command, such as the command 164, includes a request for information, a request to control a part of the communication session, a request for a media content item, a request to control a device, another type of command, or a combination thereof. A request to control a part of the communication session includes a request to mute/unmute one or more devices at a particular site, a request to mute/unmute a device associated with the requester, a request to mute/unmute all devices except for a device associated with the requester, a request to connect to another device, a request to share/stop sharing multimedia content during the communication session, a request to show/hide video associated with the requester, a request to change a presentation mode associated with the communication session, another type of command, or a combination thereof. A request to control a device includes a request to activate the device, a request to deactivate the device, a request to adjust a setting (e.g., volume, brightness, etc.) of the device, another type of request, or a combination thereof.

The natural language process frontend module 124 detects the data corresponding to the command 164''' in the first output stream 148, as described further below. Additionally, in response to the command mode 172 indicating the broadcast mode, the bridge device 102 includes the data corresponding to the command 164''' in the second input stream 150. The second device 106 receives the data corresponding to the command 164'''. Based on the data corresponding to the command 164''', the second mixer module 144 outputs an audio signal corresponding to the command 164$^{(IV)}$ to the second speaker 114, and the second speaker 114 outputs acoustic waves corresponding to the command 164$^{(V)}$ at the second location 105 by the second speaker 114. Further, the second microphone 112 detects the acoustic waves corresponding to the command 164$^{(V)}$ and transmits an audio signal indicating the command 164$^{(VI)}$ to the second device 106. In addition, the second echo canceller module 138 may perform echo cancellation, as described above, to remove the command from the audio signal from the second microphone 112. Accordingly, data corresponding to the command 164 is not be included (or is lessened) in the second output stream 152.

As explained above, the natural language process frontend module 124 detects the data corresponding to the command 164" in the first output stream 148. The natural language process frontend module 124 performs one or more actions based on content of the command 164, based on the command mode 172, based on a communication session context, or a combination thereof. In some embodiments, the communication session context is identified by the meeting analytics module 122 and includes information identifying one or more "meeting objects." The one or more meeting objects include a speaker of the command 164, a list of participants in the communication session, a list of locations associated with the communication session, a list of user profiles associated with the communication session, a list of available commands, a list of media content items associated with the communication session, a list of devices associated with the communication session, a list of supported spoken commands, or a combination thereof.

In some examples, the meeting analytics module 122 generates a graphical user interface based on the communication session context, one or more contexts associated with previous communication sessions, or a combination thereof. The graphical user interface identifies one or more meeting objects. The bridge device 102 transmits the graphical user interface to the first device 104 and the second device 106 as part of the communication session (e.g., via the first input stream 146 and the second input stream 150). The first device 104 and the second device 106 output (e.g., to display devices) the graphical user interface to enable users to interact with the graphical user interface using one or more spoken commands (e.g., the command 164). In a particular embodiment, the meeting analytics module 122 monitors the first output stream 148 and the second output stream 152 to identify a keyword spoken during the communication session. In some embodiments, a keyword corresponds to a tag applied (e.g., by a user or by an automated system) to one or more media content items accessible to the natural language process backend module 120. In response to detecting the keyword in the communication session, the first meeting analytics module 122 causes the graphical user interface to display the keyword. In some embodiments, the command 164 corresponds to a request for the one or more media content items associated with the keyword.

In a first example of performing one or more actions, in response to determining that content of the command 164 corresponds to the phrase "create a meeting summary," the natural language process frontend module 124 causes the meetings analytics module 122 to create a meeting summary associated with the communication session. Creating the meeting summary includes recording the communication session, generating a speech to text transcription based on the recording, identifying key phrases from the transcription, identifying sentiments expressed in the communication session, identifying active speakers in the communication session, identifying communication session participants, generating minutes of the communication session, or a combination thereof. In some embodiments, the meeting analytics module 122 further causes the natural language process backend module 120 to E-mail the summary to meeting participants based on the context session context.

In a second example, in response to determining that content of the command 164 corresponds to the phrase "what's the weather like?" the natural language process frontend module 124 identifies that the command 164 is associated with the first location 103 based on the communication session context. The natural language process frontend module 124 causes the natural language process backend module 120 to transmit a request for weather information to a weather service.

In a third example, in response to determining that content of the command 164 corresponds to the phrase "turn the lights on" the natural language process frontend module 124 identifies that the command 164 is associated with the first location 103 based on the communication session context (e.g., the command being from a user at the first location 103 and being a command that specifies a location-centric operation, such as controlling a lighting device). The natural language process frontend module 124 then causes the natural language process backend module 120 to transmit an activation signal to a lighting device associated with the first location 103. In some embodiments, the first user 160 provides an additional phrase to override context-based location processing. For example, in response to the command 164 corresponding to the phrases "turn the lights on" and "at the second location," the natural language process frontend module 124 identifies that the command 164 is associated with the second location 106.

In a fourth example, the natural language process frontend module 124 determines whether the first user 160 is authorized to initiate the command 164 (e.g., muting another user). The natural language process frontend module 124 determines whether the first user 160 is authorized based on a user profile accessible to the meeting analytics module 122. In an illustrative example, the user profile indicates a permission level associated with the first user 160, and the natural language process frontend module 124 determines whether the first user 160 is authorized to initiate the command 164 based on the permission level.

In some implementations, each permission level is associated with set of privileges that define what commands may be initiated by a user having the permission level. Examples of permission levels include "Administrator," "Presenter," and "Listener." Examples of privileges include "granted," "prohibited," and "by request." Users associated with a permission level are able to initiate all "granted" commands associated with the permission level and are not able to initiate "prohibited" commands associated with the permission level. Users of a permission level must receive permission from another user (e.g., a user associated with the "Administrator" permission level) before initiating "by request" commands associated with the permission level.

In an illustrative example, the command 164 is a by request command associated with a profile of the first user 160 and the second user 162 is an administrator. Accordingly, the natural language process frontend module 124 transmits a permission request to the second user 162 in response to the command 164. The second device 106 generates a response to the permission request based on input (e.g., voice input) from the second user 162. The second device 106 receives the input from the second user 162 either before or after the permission request is sent to the second device 106. To illustrate, the second device 106 may output the permission request via the second speaker 114 and then the second user 162 may enter the input via the second microphone 112 (e.g., by speaking "yes" or "no"). Alternatively, the second user 162 may enter the input via the second microphone 112 (e.g., by speaking "automatically grant permission to listeners to initiate X" or "automatically deny permission to listeners to initiate X" where X is a command) without the second device 106 outputting the permission request. Based on the response to the permission request, the natural language process frontend 124 determines whether the first user 160 is authorized to initiate the command 164.

In a fifth example, a presenter discussing a trip to Rome during the communication session says a keyword, such as "Rome." The meeting analytics module 122 determine that the natural language process backend module 120 has access (e.g., via a storage device of the bridge device 102 or via a network connection) to an image tagged with the keyword (e.g., "Rome"). Accordingly, the meeting analytics module 122 updates the graphical user interface to display the keyword, and the first device 104 displays the user interface to the first user 160. In this example, the command 164 corresponds to the first user 160 saying "Show me more about the Rome trip," and the one or more actions include retrieving the media content item associated with the keyword "Rome."

After performing the one or more actions, the natural language process frontend module 124 generates a reply 168. In the illustrated example, the reply 168 corresponds to audio content (e.g., generated using a text to speech process), but in some embodiments, the reply 168 includes audio content, video content, text content, or any combination thereof. The reply 168 indicates information (e.g., a weather report) retrieved as part of the one or more actions, reports that the one or more actions have been completed (e.g., "the lights are now on"), reports that the first user 160 is not authorized to initiate the command 164 (e.g., based on the user profile), includes a media content item (e.g., associated with a keyword, as described above), or a combination thereof. In response to the command mode 172 indicating the broadcast mode, the natural language process frontend module 124 broadcasts data corresponding to the reply 168' as part of the communication session.

The first device 104 receives the data corresponding to the reply 168', and the first mixer module 134 outputs an audio signal corresponding to the reply 168" to the first speaker 108. Based on the audio signal corresponding to the reply 168", the first speaker 108 outputs acoustic waves corresponding to the reply 168''' at the first location 103. Further, the first microphone 110 detects the acoustic waves corresponding to the reply 168''' and transmits an audio signal indicating the reply $168^{(IV)}$ to the first device 104. The first echo canceller 132 removes or reduces the reply 168 from the audio signal, as explained above. Accordingly, data corresponding to the reply 168 is not included (or is reduced) in the first output stream 148.

Further, the second device 106 receives the data corresponding to the reply 168'. The second mixer module 144 outputs an audio signal corresponding to the reply $168^{(V)}$ to the second speaker 114. Based on the audio signal corresponding to the reply $168^{(V)}$, the second speaker 114 outputs acoustic waves corresponding to the reply 168" at the second location 105. Further, the second microphone 112 detects the acoustic waves corresponding to the reply 168" and transmits an audio signal indicating the reply $168^{(VII)}$ to the second device 106. The second echo canceller 138 removes or reduces the reply 168 from the audio signal received from the second microphone 112, as explained above. Accordingly, data corresponding to the reply 168 is not included (or is reduced) in the second output stream 152.

It should be noted that in some use cases, the bridge device 102 receives a wake up message from one device and respond to a spoken command received from a different device. For example, in some implementations, after receiving the wake up message 170 from the first device 104, the bridge device 102 receives a spoken command received from the second device 106. In some embodiments, the bridge device 102 is configured to respond to any detected spoken command regardless of a source of the spoken command. Accordingly, in some embodiments, the bridge device 102 responds to the spoken command received from the second device 106 after receiving the wake up message 170 from the first device 104. In some embodiments, the wake up message 170 indicates to which devices the bridge 102 should or should not respond. Thus, in some embodiments, the bridge device 102 is configured to, based on the wake up message 170, respond to spoken commands received from one or more devices and to ignore spoken commands received from one or more other devices. Accordingly, in some embodiments, the bridge device 102 ignores the spoken command received from the second device 106 based on the wake up message 170 indicating that the bridge device 102 should process spoken commands from the first device 104 or that the bridge device 102 should not process spoken commands from the second device 106. In some examples, the first device 104 causes the wake up message 170 identifies devices based on the wake up phrase 166, based on button commands indicated by a signal from a remote control device, or a combination thereof.

In some implementations, the natural language process frontend module 124 "goes back to sleep" (e.g., ceases monitoring the first output stream 148 and the second output stream 152) in response to generating a reply (e.g., the reply 168), in response to a threshold period of time elapsing since receipt of the wake up message 170, or in response to a sleep message received from the first device 104 (or the second device 106). In some embodiments, the sleep message is generated by the first audio room process module 126 (or the second audio room process module 128) in response to a sleep trigger (e.g., passing of a threshold period of time since generation of the wake up message 170, detection of a sleep phrase in signals generated by the first microphone 110 (or the second microphone 112), receipt of a signal from a remote control device, etc.).

Thus, the system 100 of FIG. 1 enables processing of and response to voice commands during a communication session. In particular, the system 100 determines to transmit a command spoken during a communication session to one or more devices selected based on a command mode associated with the command. Further, the system 100 transmits a reply to the command to devices selected based on the command mode. As illustrated in FIG. 1, the first device 104 and the bridge device 102, operating according to a broadcast mode, place command content and reply content in streams associated with a communication session. Accordingly, a command spoken at the first location 103 and during the communication session is presented at a second location participating in the communication session. Further, a reply to the command is presented at the second location.

Referring to FIG. 2, another diagram illustrating the system 100 for replying to a spoken command is shown. As indicated above, FIG. 2 illustrates the bridge device 102 responding to a spoken command according to a local mode. As explained above, the bridge device 102 enables the communication session between the first device 104 and the second device 106 via the first input stream 146, the first output stream 148, the second input stream 150, and the second output stream 152.

In the example illustrated in FIG. 2, the first user 160 speaks a wake up phrase 202, and the first microphone 110 receives audio waves corresponding to the wake up phrase 202' during the communication session (e.g., during a teleconference). For example, the first microphone 110 receives audio waves corresponding to the first user 160 saying "wake up local mode." The first microphone 110 converts the audio waves corresponding to the wake up phrase 202' to a signal (e.g., a digital or analog electrical or radio signal) indicating the wake up phrase 202" and transmits the signal to the first device 104. The first wake up detector module 130 searches input from the first microphone 110 for the wake up phrase 202. In response to detecting the signal indicating the wake up phrase 202", the first wake up detector module 130 causes the first device 104 to transmit a wake up message 204 to the bridge device 102. The wake up message 204 indicates a command mode 206. The first wake up detector module 130 determines the command mode 206 based on the wake up phrase 202. For example, in some implementations, the first wake up detector module 130 sets the command mode 206 to local mode in response to the wake up phrase 202 corresponding to "wake up local mode." It should be noted that in other embodiments, the first device 104 transmits the wake up message 204 in response to a different triggering signal. For example, in some embodiments, the first device 104 transmits the wake up message 204 to the bridge device 102 in response to a signal from a remote control device indicating a button selection. Further, in some embodiments, the first device 104 selects the command mode 206 based on content of the triggering signal or a source (e.g., the remote control device or the first microphone 110) of the triggering signal. For example, the first device 104 selects the command mode 206 based on which button of the remote control device is indicated by the signal (or based on content of the wake up phrase 202). In some embodiments, the wake up phrase 202, the button (or a combination of buttons) indicated by the signal, or a combination thereof further identify to which of the first device 104 and the second device 106 the bridge device 102 is to respond in the local mode.

In addition to transmitting the wake up message 103 to the bridge device 102, the first device 104 establishes additional communication streams with the bridge device 102 in response to the triggering signal (e.g., the wake up phrase 202 or the remote control signal). In some examples, the first device 104 establishes the additional communication streams in response to the wake up phrase 202, the button (or combination of buttons) indicated by the signal from the remote control device, or a combination thereof identifying the first device 104. In alternative embodiments (not shown), the wake up message 204 instructs the bridge device 102 to establish the additional communication streams with the second device 106 in response to the wake up phrase 202, the button (or combination of buttons) indicated by the signal from the remote control device, or a combination thereof identifying the second device 106.

In the example illustrated in FIG. 2, the first audio room process module 126 establishes a local input stream 210 to receive data from the bridge device and a local output stream 208 to transmit data to the bridge device. In some examples, the wake up message 204 is transmitted to the bridge device 102 via the local output stream 208. The local input stream 210 and the local output stream 208 are distinct from the communication session. For example, the bridge device 102 does not transmit content received via the local output stream 208 to the second device 106. The first controller module 136 controls which of the first output stream 148 and the local output stream 208 is used to output content to the bridge device 102. In some examples, the first controller module 136 "mutes" (e.g., ceases transmitting content through) the first output stream 148 in response to the command mode 206 corresponding to the local model. Accordingly, the second device 106 does not receive content from the first device 104 while the first device 104 and the bridge device 102 are operating in the local mode. The first mixer module 134 generates audio signals to be output by the first speaker 108 based on one or both of the local input stream 210 and the first input stream 146. In some examples, the first mixer module 134 "mutes" (e.g., cease using) the first input stream 210 while the first device 104 and the bridge device 102 are operating in the local mode.

In response to receiving the wake up message 204, the natural language process frontend module 124 "wakes up" and begins searching one or more streams for one or more spoken commands based on the command mode 206. In the local mode, the natural language process frontend module 124 searches one or more streams that are not associated with the communication session (e.g., the teleconference) for the one or more commands. In the example illustrated in FIG. 2, the natural language process frontend module 124 searches the local output stream 208 for the one or more commands in response to the command mode 206 corresponding to the local mode. As explained above, the one or more spoken commands includes a request to create a summary of the communication session, a request for information (e.g., weather forecast), a request for multimedia content, a request to control a device, another type of command, or a combination thereof.

In the example illustrated in FIG. 2, the first user 160 speaks a command 212, and the first microphone 110 receives audio waves corresponding to the command 212' spoken by the first user 160 during the communication session (e.g., during a teleconference). In a particular example, the first microphone 110 receives audio waves corresponding to the first user 160 saying "What's the weather like?" The first microphone 110 converts the audio waves corresponding to the spoken command 212' to a signal (e.g., a digital or analog electrical or radio signal) indicating the command 212" and transmits the signal indicating the command 212" to the first device 104. Based on the signal indicating the command 212", the first device 104 generates data corresponding to the command 212". In response to the command mode 206 corresponding to the local mode, the first controller module 136 inserts the data corresponding to the command 212''' into the local output stream 208 but not into the first output stream 148.

The natural language process frontend module 124 detects the data corresponding to the command 212''' in the local output stream 208, and performs one or more actions. The one or more actions are based on content of the command 212, the command mode 206, a communication session context, or a combination thereof. In some embodiments, the communication session context is identified by the meeting analytics module 122 and includes information identifying one or more "meeting objects." The one or more meeting objects include a speaker of the command 212, a list of participants in the communication session, a list of locations associated with the communication session, a list of user profiles associated with the communication session, a list of available commands, a list of media content items associated with the communication session, a list of devices associated with the communication session, a list of supported spoken commands, or a combination thereof.

In some examples, the meeting analytics module 122 generates a graphical user interface based on the communication session context, one or more contexts associated with previous communication sessions, or a combination thereof. The graphical user interface identifies one or more meeting objects. The bridge device 102 transmits the graphical user interface to the first device 104 and the second device 106 as part of the communication session (e.g., via the first input stream 146 and the second input stream 150). The first device 104 and the second device 106 output (e.g., to display devices) the graphical user interface to enable users to interact with the graphical user interface using one or more spoken commands (e.g., the command 212). In a particular embodiment, the meeting analytics module 122 monitors the first output stream 148 and the second output stream 152 to identify a keyword spoken during the communication session. In some embodiments, a keyword corresponds to a tag applied (e.g., by a user or by an automated system) to one or more media content items accessible to the natural language process backend module 120. In response to detecting the keyword in the communication session, the first meeting analytics module 122 causes the graphical user interface to display the keyword. In some embodiments, the command 212 corresponds to a request for the one or more media content items associated with the keyword.

After performing the one or more actions, the natural language process frontend module 124 generates a reply 214. In the illustrated example, the reply 214 corresponds to audio content (e.g., generated using a text to speech process), but in some embodiments, the reply 214 includes audio content, video content, text content, or any combination thereof. The reply 214 indicates information (e.g., a weather report) retrieved as part of the one or more actions, reports that the one or more actions have been completed (e.g., "the lights are now on"), reports that the first user 160 is not authorized to initiate the command 212 (e.g., based on the user profile), includes a media content item (e.g., associated with a keyword, as described above), or a combination thereof. In response to the command mode 206 indicating the local mode, the natural language process frontend module 124 transmits data corresponding to the reply 214' via the local input stream 210 but not through streams associated with the communication session.

The first device 104 receives the data corresponding to the reply 214'. In response to the data corresponding to the reply 214', the first mixer module 134 outputs an audio signal corresponding to the reply 214" to the first speaker 108, and based on the audio signal corresponding to the reply 214", the first speaker 108 outputs acoustic waves corresponding to the reply 214'. Further, the first microphone 110 detects the acoustic waves corresponding to the reply 214''' and transmits an audio signal indicating the reply $214^{(IV)}$ to the first device 104. As explained above, the first echo canceller module 132 removes or reduces the reply 214 in the audio signal received from the first microphone 110. Accordingly, data corresponding to the reply 214 is not included (or is reduced) in the local output stream 208.

In some implementations, the natural language process frontend module 124 "goes back to sleep" (e.g., cease monitoring the local output stream 208) in response to generating a reply (e.g., the reply 214), in response to a threshold period of time elapsing since receipt of the wake up message 204, or in response to a sleep message received from the first device 104. In some embodiments, the sleep message is generated by the first audio room process module 126 in response to a sleep trigger (e.g., passing of a threshold period of time since generation of the wake up message 204, detection of a sleep phrase in signals generated by the first microphone 110, receipt of a signal from a remote control device, etc.). The first controller module 136 "unmutes" the first output stream 148 and mutes the local output stream 208 in response to determining (e.g., based on a notification from the first audio room process module 126 or the natural language process frontend module 124) that the natural language process frontend module 124 is asleep. Accordingly, the second device 106 receives content from the first device 104 via the bridge device 102 after the natural language process front end module 125 "goes to sleep."

Thus, the system 100 of FIG. 2 enables processing of and response to voice commands during a communication session. In particular, the system 100 determines to transmit a command spoken during a communication session to one or more devices selected based on a command mode associated with the command. Further, the system 100 transmits a reply to the command to devices selected based on the command mode. As illustrated in FIG. 2, the first device 104 and the bridge device 102 operating according to a local mode establish communication streams separate from the communication session. Accordingly, a command spoken at the first location 103 and during a communication session is not presented at a second location participating in the communication session. Further, a reply to the command is not presented at the second location.

It should be noted that, in some embodiments, the bridge device 102 operates according to the broadcast mode with respect to one device while operating according to the local mode with respect to another device. In an illustrative example, the bridge device 102 responds to a first spoken command from the first device 104 according to the local mode (as illustrated in FIG. 2) and a second spoken command from the second device 106 according to the broadcast mode (as illustrated in FIG. 1). Thus, the second command is transmitted to the first device 104 as part of a communication session between the first device 104 and the second device 106, and a reply to the second spoken command is broadcast to both the first device 104 and the second device 106 as part of the communication session. Further, a reply to the first command is transmitted to the first device 104 via a channel distinct from the communication session.

It should further be noted that, in some embodiments, the bridge device 102 supports additional operations modes. In an illustrative private mode, the bridge device 102 receives a text message from a third device via a data stream distinct from the communication session between the first device 104 and the second device 106. The bridge device 102 performs one or more actions, as explained above, in response to one or more commands included in the text message. The bridge device 102 further transmits a reply message (e.g., a reply text message) to the third device. In some implementations, the third device participates in the communication session between the first device 104 and the second device 106. In other implementations, the third device does not participate in the communication session.

Referring to FIG. 3, a diagram illustrating a system 300 for replying to a spoken command during a peer to peer communication session is shown. The system 300 includes a first device 304 located at a first location 303 and a second device 306 located at a second location 305. The first device 304 and the second device 306 correspond to the first device 104 and the second device 106 of the system 100 respectively. Accordingly, the first device 304 includes a first audio room process module 326 that corresponds to the first audio room process module 126 and the second device 306 includes a second audio room process module 328 that corresponds to the second audio room process module 128. The first audio room process module 326 includes a first wake up detector module 330, a first echo canceller module 332, a first mixer module 334, and a first controller module 336 that correspond to the first wake up detector module 130, the first echo canceller module 132, the first mixer module 134, and the first controller module 136 respectively. The second audio room process module 328 includes a second wake up detector module 340, a second echo canceller module 338, a second mixer module 344, and a second controller module 342 that correspond to the second wake up detector module 140, the second echo canceller module 138, the second mixer module 144, and the second controller module 142 respectively. In addition, the first device 304 and the second device 306 include components and/or functionality of the bridge device 102. In the illustrated example, the first device 304 includes a first natural language process backend module 320, a first meeting analytics module 322, and a first natural language process frontend module 324 that correspond to the natural language process backend module 120, the meeting analytics module 122, and the natural language process frontend module 124. The first natural language process backend module 320, the first meeting analytics module 322, and the first natural language process frontend module 324 correspond to software executable by a processor of the first device 304, to dedicated hardware components, or to a combination thereof. The second device 306 includes a second natural language process backend module 370, a second meeting analytics module 372, and a second natural language process frontend module 374 that correspond to the natural language process backend module 120, the meeting analytics module 122, and the natural language process frontend module 124. The second natural language process backend module 370, the second meeting analytics module 372, and the second natural language process frontend module 374 correspond to software executable by a processor of the second device 306, to dedicated hardware components, or to a combination thereof. Accordingly, the first device 304 and the second device 306 are analysis and response devices. In some implementations, only one of the first device 304 and the second device 306 is an analysis and response device. The first device 304 is coupled to a first speaker 308 and a first microphone 310 that correspond to the first speaker 108 and the first microphone 110. The second device 306 is coupled to a second speaker 314 and a second microphone 312 that correspond to the second speaker 114 and the second microphone 112.

The first device 304 and the second device 306 communicate in a peer to peer communication session conducted over a first stream 346 and a second stream 348. FIG. 3 illustrates the system 300 operating according to the broadcast mode, as described above with reference to FIG. 1. Accordingly, a wake up phrase 366 and a command 364 spoken by a first user 360 at the first location 303 are received at the first device 304 and transmitted to the second device 306 as part of the communication session. Further, a reply 368 generated by the first natural language process frontend module 324 in response to the command 364, as described above with reference to FIG. 1, is transmitted to the first device 304 (e.g., from one component of the first device 304 to another component of the first device 304) and to the second device 306 as part of the peer to peer communication session. Accordingly, both the first speaker 308 and the second speaker 314 output the reply 368 and the second speaker 314 outputs the wake up phrase 366 and the command 364.

Referring to FIG. 4, another diagram illustrating the system 300 for replying to a spoken command is shown. As indicated above, FIG. 4 illustrates the first device 304 responding to a spoken command according to the local mode, as described with reference to FIG. 2. Accordingly, a wake up phrase 466 and a command 464 spoken by the first user 360 at the first location 303 are received at the first device 304 and are not transmitted to the second device 306 as part of the communication session. Further, a reply 468 generated by the first natural language process frontend module 324 in response to the command 464, as described above with reference to FIG. 2, is transmitted to the first device 304 (e.g., from one component of the first device 304 to another component of the first device 304) but is not transmitted to the second device 306 as part of the peer to peer communication session. Accordingly, the first speaker 308 outputs the reply 468, and the second speaker 314 does not output the wake up phrase 466, the command 464, or the reply 468.

It should be noted that in some embodiments the first device 304 operates according to the broadcast mode while the second device 306 operates according to the local mode. In an illustrative example, the first device 304 responds to a first spoken command according to the local mode (as illustrated in FIG. 4), and the second device 306 responds to a second spoken command according to the broadcast mode (as illustrated in FIG. 3). Thus, the second command is transmitted to the first device 104 as part of a communication session between the first device 304 and the second device 306, and a reply to the second spoken command is broadcast to both the first device 304 and the second device 306 as part of the communication session. Further, a reply to the first command is not included in the communication session.

Figure 5:
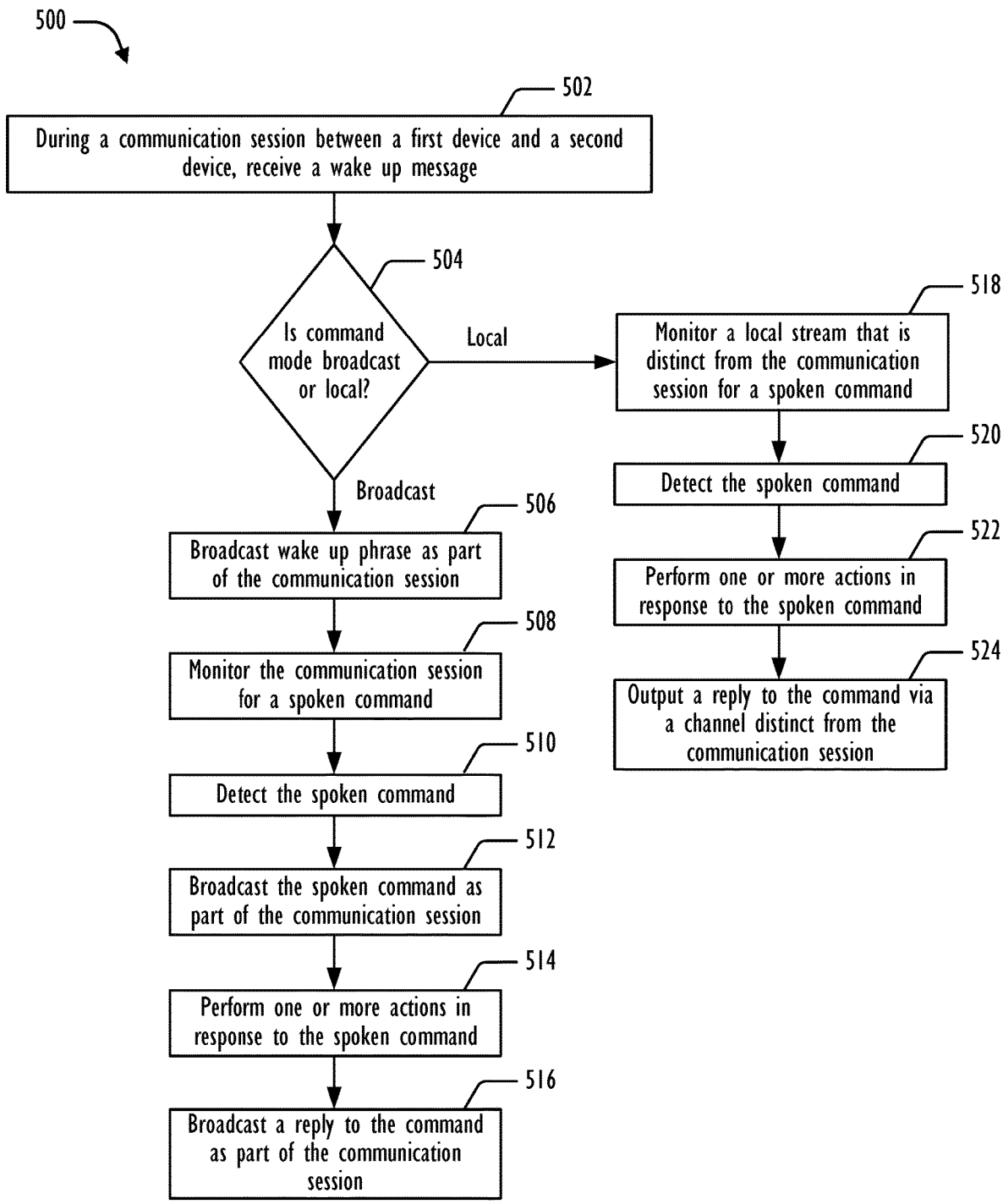
FIG. 5 is a flowchart of a method for responding to spoken commands according to the present invention.

Referring to FIG. 5, a flowchart illustrating a method 500 of replying to a spoken command is shown. In some embodiments, the method 500 is performed by the bridge device 102 of FIGS. 1 and 2, the first device 304 of FIGS. 3 and 4, the second device 306 of FIGS. 3 and 4, or a combination thereof.

The method 500 includes, during a communication session between a first device and a second device, receiving a wake up message, at 502. In the example of FIG. 1, the bridge device 102 receives the wake up message 170. In the example of FIG. 2, the bridge device receives the wake up message 204. In the example, of FIG. 3, the first device 304 receives a signal indicating the wake up phrase 366". In the example of FIG. 4, the first device 304 receives a signal indicating the wake up phrase 466"

The method 500 further includes determining whether a command mode a broadcast mode or a local mode, at 504. In the example of FIG. 1, the bridge device 102 determines that the command mode 172 associated with the wake up message 170 is the broadcast mode. In the example of FIG. 2, the bridge device 102 determines that the command mode 206 associated with the wake up message 204 is the local mode. In the example of FIG. 3, the first device 304 determines that a command mode associated with the wake up phrase 366 is the broadcast mode (e.g., based on content of the wake up phrase 366, based on a signal from a remote control device, based on a context of the communication session, or combination thereof). In the example of FIG. 4, the first device 304 determines that a command mode associated with the wake up phrase 466 is the local mode (e.g., based on content of the wake up phrase 366, based on a signal from a remote control device, based on a context of the communication session, or combination thereof).

In response to determining that command mode is the broadcast mode, the method 500 further includes broadcasting a wake up phrase as part of the communication session, at 506. In the example of FIG. 1, the bridge device 102 broadcasts the data corresponding to the wake up phrase 166''' via the second input stream 150 as part of the communication session between the first device 104 and the second device 106. In the example of FIG. 3, the first device 304 broadcasts the data corresponding to the wake up phrase 366''' via the second stream 348 as part of the communication session between the first device 304 and the second device 306.

In response to determining that command mode is the broadcast mode, the method 500 further includes monitoring the communication session for a spoken command, at 508. In the example of FIG. 1, the bridge device 102 monitors the first output stream 148 and the second output stream 152 for a spoken command. In the example of FIG. 3, the first device 304 monitors the first stream 346 for a spoken command. In addition to monitoring the communication session, the first device 304 monitors input from the first microphone 310.

In response to determining that command mode is the broadcast mode, the method 500 further includes detecting the spoken command, at 510. In the example of FIG. 1, the bridge device 102 detects the data corresponding to the command 164''' in the first output stream 148. In the example of FIG. 3, the first device 304 detects a signal indicating the command 364" from the first microphone 310.

In response to determining that command mode is the broadcast mode, the method 500 further includes broadcasting the spoken command as part of the communication session, at 512. In the example of FIG. 1, the bridge device 102 broadcasts the data corresponding to the command 164''' to the second device 106 via the second input stream 150. In the example of FIG. 3, the first device 304 broadcasts data indicating the command 364''' to the second device 306 via the second stream 348.

In response to determining that command mode is the broadcast mode, the method 500 further includes performing one or more actions in response to the spoken command, at 514. In the example of FIG. 1, the bridge device 102 performs one or more actions, such as generating a meeting summary, retrieving content, retrieving information, issuing commands to a device, or a combination thereof based on the command 164. In the example of FIG. 3, the first device 304 performs one or more actions, as described above, in response to the command 364.

In response to determining that command mode is the broadcast mode, the method 500 further includes broadcasting a reply to the spoken command as part of the communication session, at 516. In the example of FIG. 1, the bridge device 102 broadcasts the data corresponding to the reply 168' to the first device 104 via the first input stream 146 and to the second device 106 via the second input stream 150. In the example of FIG. 3, the first device 304 broadcasts data indicating the reply 368' to the second device 306 via the second stream 348. The first device 304 also outputs an audio signal indicating the reply $368^{(IV)}$ to the first speaker 308.

In response to determining that command mode is the local mode, the method 500 further includes monitoring a local stream that is distinct from the communication session for a spoken command, at 518. In the example of FIG. 2, the bridge device 102 monitors the local output stream 208 for a spoken command. In the example of FIG. 4, the first device 304 monitors input from the first microphone 310 for a spoken command.

In response to determining that command mode is the local mode, the method 500 further includes detecting the spoken command, at 520. In the example of FIG. 2, the bridge device 102 detects the data corresponding to the command 212" in the local output stream 208. In the example of FIG. 4, the first device 304 detects a signal indicating the command 464" in input from the first microphone 310.

In response to determining that command mode is the local mode, the method 500 further includes performing one or more actions in response to the spoken command, at 522. In the example of FIG. 2, the bridge device 102 performs one or more actions, such as generating a meeting summary, retrieving content, retrieving information, issuing commands to a device, or a combination thereof based on the command 212. In the example of FIG. 4, the first device 304 performs one or more actions, as described above, in response to the command 464.

In response to determining that command mode is the local mode, the method 500 further includes outputting a reply to the command via a channel distinct from the communication session, at 524. In the example of FIG. 2, the bridge device 102 outputs the data corresponding to the reply 214' to the first device 104 via the local input stream 210. In the example of FIG. 4, the first device 304 outputs an audio signal indicating the reply 468' to the first speaker 308.

Thus, the method 500 enables processing of and reply to spoken commands. In particular the method 500 enables a device to determine how to respond to commands spoken during a communication session between devices. Therefore, the method 500 enables spoken commands to be used during a communication session between devices.

Figure 6:
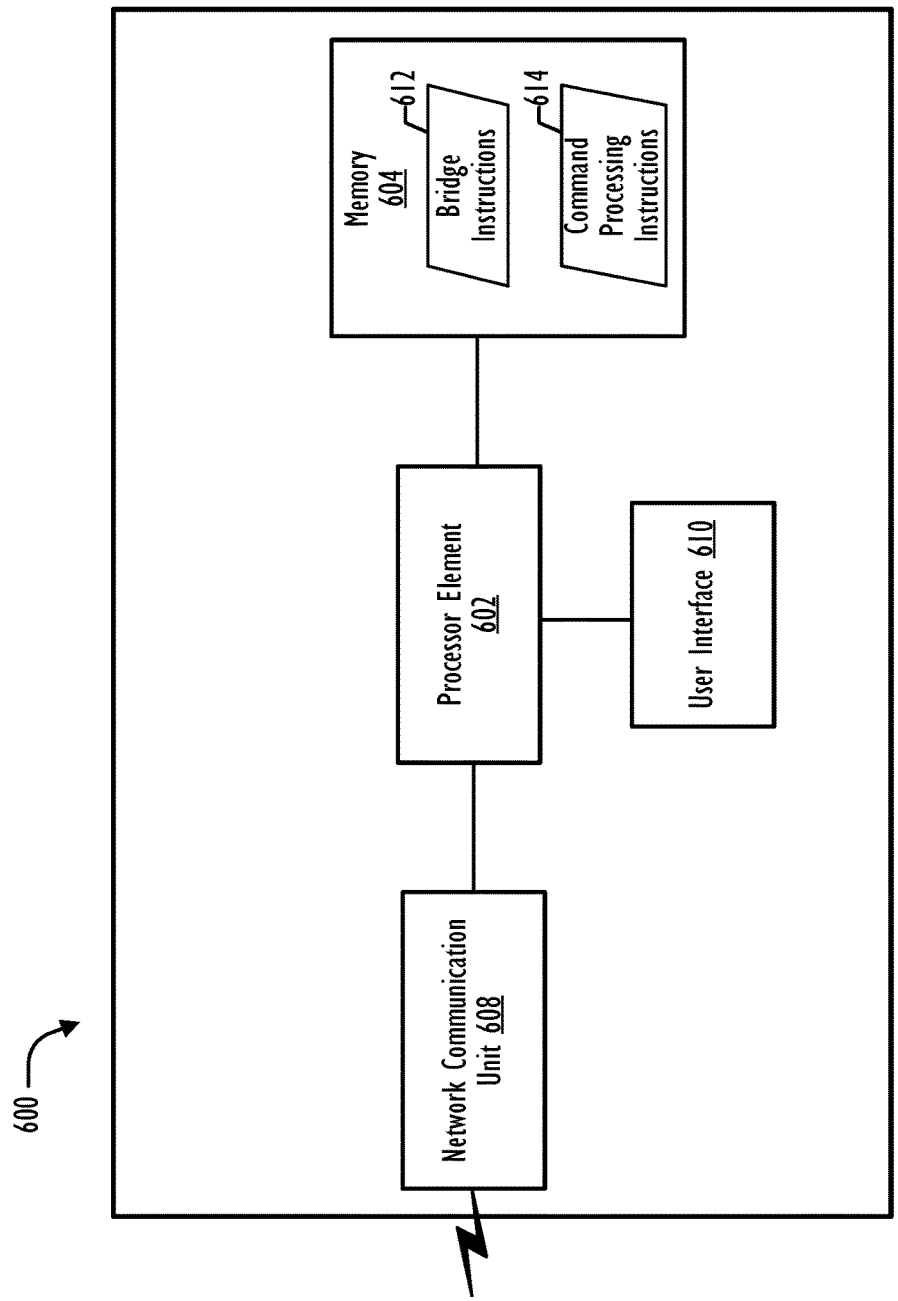
FIG. 6 illustrates a computing device corresponding to a bridge device and operable to perform one or more methods disclosed herein according to the present invention.

Referring now to FIG. 6, a block diagram illustrates a computing device 600 that is usable to implement the techniques described herein in accordance with one or more embodiments. For example, the computing device 600 illustrated in FIG. 6 could represent a client device or a physical server device. In some implementations, the computing device 600 corresponds the bridge device 102. As shown in FIG. 6, the computing device 600 can include one or more input/output devices, such as a network communication unit 608 that could include a wired communication component and/or a wireless communications component, which can be coupled to processing element 602. The network communication unit 608 can utilized any of a variety of standardized network protocols, such as Ethernet, TCP/IP, to name a few of many protocols, to effect communications between devices and comprise one or more transceiver(s) that utilize the Ethernet, power line communication (PLC), WiFi, and/or other communication methods.

The computing system 600 includes a processing element 602 that contains one or more hardware processors, where each hardware processor have a single or multiple processor cores. In one embodiment, the processing element 602 includes at least one shared cache that stores data (e.g., computing instructions) that are utilized by one or more other components of processing element 602. In a particular example, the shared cache corresponds to locally cached data stored in a memory for faster access by components of the processing elements 602. In one or more embodiments, the shared cache includes one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 6, in some embodiments, the processing element 602 includes one or more other types of hardware processing components, such as graphics processing units (GPU), application specific integrated circuits (ASICs), field-programmable gate arrays (FPGAs), and/or digital signal processors (DSPs).

FIG. 6 illustrates that memory 604 is operatively coupled to processing element 602. In some embodiments, memory 604 corresponds to a non-transitory medium configured to store various types of data. In an illustrative example, the memory 604 includes one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device is used to store overflow data if allocated RAM is not large enough to hold all working data. In some examples, the non-volatile storage device is also used to store programs that are loaded into the RAM when such programs are selected for execution. In the illustrated example, the memory 604 stores bridge instructions 612 and command processing instructions 614. The bridge instructions 612 and the command processing instructions 614 are executable by the processor element 602 to perform one or more of the operations or methods described with respect to FIGS. 1-2 and FIG. 5. In particular, the bridge instructions 612 are executable by the processor element 602 to perform functions of a communication bridge. For example, in some implementations, the bridge instructions 612 are executable by the processor element 602 to process data received from the network communication unit 608 and to provide data to the network communication unit 608 in order to establish a communication session (e.g., a teleconference) between two devices. The command processing instructions 614 are executable by the processor element 602 to perform one or more actions described above in connection with responding to spoken commands. In some implementations, the command processing instructions 614 are executable to provide functionality of the natural language process backend module 120, the meeting analytics module 122, the natural language process frontend module 124, or a combination thereof.

Persons of ordinary skill in the art are aware that software programs may be developed, encoded, and compiled in a variety computing languages for a variety software platforms and/or operating systems and subsequently loaded and executed by processing element 602. In one embodiment, the compiling process of the software program transforms program code written in a programming language to another computer language such that the processing element 602 is able to execute the programming code. For example, the compiling process of the software program may generate an executable program that provides encoded instructions (e.g., machine code instructions) for processor element 602 to accomplish specific, non-generic, particular computing functions.

After the compiling process, the encoded instructions are then be loaded as computer executable instructions or process steps to processing element 602 from storage (e.g., memory 604) and/or embedded within the processing element 602 (e.g., cache). Processing element 602 can execute the stored instructions or process steps in order to perform operations or process steps to transform the computing device into a non-generic, particular, specially programmed machine or apparatus. Stored data, e.g., data stored by a storage device, can be accessed by processing element 602 during the execution of computer executable instructions or process steps to instruct one or more components within the computing device 600.

A user interface 610 can include a display, positional input device (such as a mouse, touchpad, touchscreen, or the like), keyboard, or other forms of user input and output devices. The user interface 610 can be coupled to processor element 602. Other output devices that permit a user to program or otherwise use the computing device can be provided in addition to or as an alternative to network communication unit 608. When the output device is or includes a display, the display can be implemented in various ways, including by a liquid crystal display (LCD) or a cathode-ray tube (CRT) or light emitting diode (LED) display, such as an OLED display. It should be noted that, in some embodiments, the computing device 600 comprises other components, such as sensors, powers sources, and/or analog-to-digital converters, not explicitly shown in FIG. 6.

Referring now to FIG. 7, a block diagram illustrates a computing device 700 that is usable to implement the techniques described herein in accordance with one or more embodiments. For example, the computing device 700 illustrated in FIG. 7 could represent a client device or a physical server device. In some implementations, the computing device 700 corresponds the first device 104, the second device 106, the first device 304, the second device 306, or a combination thereof. As shown in FIG. 7, the computing device 700 includes a processor element 702 coupled to a user interface 710, a memory 704, and a network communication unit 708. In some implementations, the processor element 702, the user interface 710, the memory 704, and the network communication unit 708 include one or more devices described above with reference to the processor element 602, the user interface 610, the memory 604, and the network communication unit 608. The processor element is further coupled to a speaker 722 and a microphone 724.

In the illustrated example, the memory 704 stores endpoint instructions 712 and command processing instructions 714. In some implementations (e.g., some implementations in which endpoints are configured to communicate via a bridge device), the memory 704 does not store the command processing instructions 714. The bridge endpoint instructions 712 and the command processing instructions 714 are executable by the processor element 602 to perform one or more of the operations or methods described with respect to FIGS. 1-5. In particular, the endpoint instructions 712 are executable by the processor element 702 to perform functions of a communication endpoint (e.g., an audio input/output device). For example, in some implementations, the endpoint instructions 712 are executable by the processor element 702 to establish a communication session with another endpoint (e.g., a bridge facilitated communication session or a peer to peer communication session). During the communication session, the endpoint instructions 712 are executable by the processor element 702 to process audio signals received from the microphone 724 into audio data and to provide the audio data to the network communication unit 708 to be communicated to another device. The endpoint instructions 712 are further executable by the processor element 702 to receive additional audio data from the network communication unit 708 and to output an additional audio signal to the speaker 722 based on the additional audio data. The communication session may be facilitated by a bridge device or may be a peer to peer communication session.

The command processing instructions 714 are executable by the processor element 702 to perform one or more actions described above in connection with transmitting and responding to spoken commands. The microphone 724 is configured to detect the spoken commands and various associated phrases. In some implementations, the command processing instructions 714 are executable to provide functionality of the first wake up detector module 130, the first echo canceller module 132, the first mixer module 134, the first controller module 136, the second echo canceller module 138, the second wake up detector module 140, the second controller module 142, the second mixer module 144, the first wake up detector module 330, the first echo canceller module 332, the first mixer module 334, the first controller module 336, the second controller module 342, the second mixer module 344, the second wake up detector module 340, the second echo canceller module 338, the first natural language process backend module 320, the first meeting analytics module 322, the first natural language process frontend module 324, or a combination thereof.

As discussed above, the systems and methods described above with reference to FIGS. 1-7 enable a system to process and respond to spoken commands during a communication session (e.g., a teleconference). Accordingly, a user can use spoken commands in lieu of or in addition to remote control commands to interact with the system during the communication session. Spoken commands may be more convenient as compared to remote control entered commands. Additionally, a manufacturer may create a system that supports many more commands than an associated remote control device supports.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations are understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having is understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim 1s incorporated as further disclosure into the specification and the claims are embodiment(s) of the present disclosure.

It is to be understood that the above description is intended to be illustrative, and not restrictive. For example, the above-described embodiments are useable in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that has a publication date after the priority date of this application.

What is claimed is:

1. A method comprising:
    during a teleconference between a first audio input/output device and a second audio input/output device, receiving, at an analysis and response device, a signal indicating a wake up message, the wake up message having a wake up element and a command mode element, and selecting a command mode of a plurality of command modes based on the wake up message command mode element;
    during the teleconference between the first audio input/output device and the second audio input/output device, receiving, at an analysis and response device, a signal indicating a spoken command, the spoken command associated with the selected command mode of the plurality of command modes; and
    in response to receiving the signal, generating, at the analysis and response device, a reply message based on the spoken command, the reply message to be output to one or more devices selected based on the selected command mode of the plurality of command modes, wherein the one or more devices include the first audio input/output device, the second audio input/output device, or a combination thereof,
    wherein the plurality of command modes includes a local mode and a broadcast mode.

2. The method of claim 1, wherein the signal indicating the spoken command is received from the first audio input/output device, and in response to the command mode corresponding to the local mode, the one or more devices include the first audio input/output device but not the second audio input/output device.

3. The method of claim 1, wherein the analysis and response device corresponds to a bridge device configured to facilitate the teleconference, the method further comprising transmitting the reply message from the analysis and response device to the first audio input/output device.

4. The method of claim 1, wherein the analysis and response device corresponds to the first audio input/output device.

5. The method of claim 1, wherein the signal indicating the spoken command is received from the first audio input/output device, and in response to the command mode corresponding to the broadcast mode, the one or more devices include the first audio input/output device and the second audio input/output device.

6. The method of claim 5, wherein in response to the command mode corresponding to the broadcast mode, the method further includes transmitting data indicating the spoken command to the second audio input/output device.

7. The method of claim 1, wherein the spoken command corresponds to a request for information, a request to generate a meeting summary, a request to control a function of a device, or a combination thereof.

8. The method of claim 1, wherein the analysis and response device corresponds to an intermediate device configured to facilitate the teleconference between the first audio input/output device and the second audio input/output device.

9. The method of claim 8, wherein the signal indicating the spoken command is received from the first audio input/output device, and wherein the wake up message is received from the first audio input/output device.

10. The method of claim 8, wherein the signal indicating the spoken command is received from the first audio input/output device as part of a first audio stream that is distinct from a second audio stream associated with the teleconference.

11. The method of claim 8, wherein the signal indicating the spoken command is received from the first audio input/output device as part of an audio stream associated with the teleconference.

12. The method of claim 1, wherein the wake up message is a spoken wake up message.

13. The method of claim 1, further comprising performing echo cancellation at each of the one or more devices to remove or reduce the spoken command in audio signals received at the one or more devices.

14. The method of claim 1, wherein the wake up message corresponds to an indication of a selection of a button of a plurality of buttons of a remote control device, the selection of any button of the plurality of buttons corresponding to the wake up element and the selection of the particular button of the plurality of buttons corresponding to the command mode element.

15. An apparatus comprising:
a processor; and
a memory storing instructions that, when executed by the processor, cause the processor to perform operations including:
during a communication session between a first audio input/output device and a second audio input/output device, receiving a signal indicating a wake up message, the wake up message having a wake up element and a command mode element, and selecting a command mode of a plurality of command modes based on the wake up message command mode element;
during the communication session between the first audio input/output device and the second audio input/output device, receiving a signal indicating a spoken command, the spoken command associated with the selected command mode of the plurality of command modes; and
in response to receiving the signal, generating a reply message based on the spoken command, the reply message to be output to one or more devices selected based on the selected command mode of the plurality of command modes, wherein the one or more devices include the first audio input/output device, the second audio input/output device, or a combination thereof,
wherein the plurality of command modes includes a local mode and a broadcast mode.

16. The apparatus of claim 15, wherein the spoken command is associated with a user and wherein the operations further include:
determining, based on a profile associated with the user, whether the user is authorized to initiate the spoken command; and
in response to determining that the user is unauthorized to initiate the spoken command, the reply message indicates that the user is unauthorized.

17. The apparatus of claim 15, wherein the operation further include:
identifying a keyword spoken during the communication session; and
transmitting an indication of the keyword to the first device, wherein the spoken command corresponds to a request to access a media content item associated with the keyword and the reply message includes the media content item.

18. The apparatus of claim 17, wherein the operations further include identifying that the media content item is associated with the keyword based on a tag applied to the media content item.

19. A computer-readable storage device storing instructions that, when executed by a processor, cause the processor to perform operations comprising:
during a communication session between a first audio input/output device and a second audio input/output device, receiving a signal indicating a wake up message, the wake up message having a wake up element and a command mode element, and selecting a command mode of a plurality of command modes based on the wake up message command mode element;
during the communication session between the first audio input/output device and the second audio input/output device, receiving a signal indicating a spoken command, the spoken command associated with the selected command mode of the plurality of command modes; and
in response to receiving the signal, generating a reply message based on the spoken command, the reply message to be output to one or more devices selected based on the selected command mode of the plurality of command modes, wherein the one or more devices include the first audio input/output device, the second audio input/output device, or a combination thereof, wherein the plurality of command modes includes a local mode and a broadcast mode.

20. The computer-readable storage device of claim 19, wherein the operations further include:
    generating a user interface associated with the communication session based on first data associated with the communication session, second data associated with a previous communication session, or a combination thereof; and
    transmitting the user interface to the first device and to the second device.

21. The computer-readable storage device of claim 20, wherein the user interface identifies a list of supported spoken commands.

* * * * *